(12) United States Patent
Poplavski et al.

(10) Patent No.: US 9,639,739 B2
(45) Date of Patent: *May 2, 2017

(54) FACIAL IMAGE BUCKETING WITH EXPECTATION MAXIMIZATION AND FACIAL COORDINATES

(71) Applicant: International Business Machines Corporation, Armonk, NY (US)

(72) Inventors: Michael Poplavski, Austin, TX (US); Scott Schumacher, Porter Ranch, CA (US); Prachi Snehal, San Jose, CA (US); Sean J. Welleck, Austin, TX (US); Alan Xia, Austin, TX (US); Yinle Zhou, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,038

(22) Filed: May 28, 2016

(65) Prior Publication Data

US 2016/0275340 A1    Sep. 22, 2016

Related U.S. Application Data

(63) Continuation of application No. 14/447,571, filed on Jul. 30, 2014, now Pat. No. 9,405,963.

(51) Int. Cl.
*G06K 9/00* (2006.01)
*G06F 17/30* (2006.01)
(Continued)

(52) U.S. Cl.
CPC ... *G06K 9/00281* (2013.01); *G06F 17/30256* (2013.01); *G06K 9/00288* (2013.01);
(Continued)

(58) Field of Classification Search
None
See application file for complete search history.

(56) References Cited

U.S. PATENT DOCUMENTS

| | | | |
|---|---|---|---|
| 6,594,629 B1 | 7/2003 | Basu et al. | |
| 6,774,917 B1 * | 8/2004 | Foote | G06F 17/30814 |
| | | | 707/E17.028 |

(Continued)

FOREIGN PATENT DOCUMENTS

| | | |
|---|---|---|
| CN | 103207898 | 7/2013 |
| KR | 1020040013951 | 2/2004 |

OTHER PUBLICATIONS

Carson, Chad, et al., "Blobworld: A System for Region-Based Image Indexing and Retrieval (long version)*", Visual Information and Information Systems. Springer Berlin Heidelberg, 1999.

(Continued)

*Primary Examiner* — Iman K Kholdebarin
(74) *Attorney, Agent, or Firm* — Marcia L. Doubet

(57) ABSTRACT

Facial image bucketing is disclosed, whereby a query for facial image recognition compares the facial image against existing candidate images. Rather than comparing the facial image to each candidate image, the candidate images are organized or clustered into buckets according to their facial similarities, and the facial image is then compared to the image(s) in most-likely one(s) of the buckets. The organizing uses particular selected facial features, computes distance between the facial features, and selects ones of the computed distances to determine which facial images should be organized into the same bucket.

17 Claims, 7 Drawing Sheets

(51) Int. Cl.
*G06K 9/62* (2006.01)
*G06K 9/64* (2006.01)

(52) U.S. Cl.
CPC ....... *G06K 9/00295* (2013.01); *G06K 9/6218* (2013.01); *G06K 9/6262* (2013.01); *G06K 9/64* (2013.01)

(56) References Cited

U.S. PATENT DOCUMENTS

| | | | | |
|---|---|---|---|---|
| 7,317,816 | B2* | 1/2008 | Ray | G06K 9/00281 |
| | | | | 382/118 |
| 7,809,722 | B2* | 10/2010 | Gokturk | G06F 17/30256 |
| | | | | 382/305 |
| 8,014,572 | B2 | 9/2011 | Xiao et al. | |
| 2004/0197013 | A1* | 10/2004 | Kamei | G06K 9/00268 |
| | | | | 382/118 |
| 2005/0147292 | A1* | 7/2005 | Huang | G06K 9/00228 |
| | | | | 382/159 |
| 2006/0056667 | A1 | 3/2006 | Waters | |
| 2006/0253491 | A1* | 11/2006 | Gokturk | G06F 17/30256 |
| 2007/0024723 | A1* | 2/2007 | Ichimasa | G06K 9/6807 |
| | | | | 348/231.99 |
| 2009/0169065 | A1* | 7/2009 | Wang | G06F 17/30781 |
| | | | | 382/118 |
| 2009/0185723 | A1* | 7/2009 | Kurtz | G06K 9/00288 |
| | | | | 382/118 |
| 2010/0172551 | A1* | 7/2010 | Gilley | G06K 9/00288 |
| | | | | 382/118 |
| 2010/0191541 | A1 | 7/2010 | Prokoski | |
| 2010/0195872 | A1* | 8/2010 | Velardo | G06K 9/00771 |
| | | | | 382/106 |
| 2011/0135166 | A1* | 6/2011 | Wechsler | G06K 9/00288 |
| | | | | 382/118 |
| 2011/0293157 | A1* | 12/2011 | Ye | G06K 9/6226 |
| | | | | 382/131 |
| 2012/0243750 | A1* | 9/2012 | De Vos | G06K 9/00221 |
| | | | | 382/118 |
| 2012/0288170 | A1* | 11/2012 | McVey | G06K 9/52 |
| | | | | 382/128 |
| 2014/0079297 | A1* | 3/2014 | Tadayon | G06K 9/00 |
| | | | | 382/118 |
| 2014/0140610 | A1* | 5/2014 | Tu | G06K 9/628 |
| | | | | 382/159 |
| 2015/0057736 | A1* | 2/2015 | Zachar | A61N 5/04 |
| | | | | 607/154 |
| 2016/0034749 | A1* | 2/2016 | Poplavski | G06K 9/00281 |
| | | | | 382/118 |

OTHER PUBLICATIONS

Liaw, Shu-Sheng, et al., "A New Knowledge-Based Face Image Indexing System through the Internet", IEEE, published in Advanced Communication Technology, 2006. ICACT 2006. The 8th International Conference, vol. 2, Feb. 20-22, 2006, pp. 1336-1340.

Jafri, Rabia, et al., "A Survey of Face Recognition Techniques", Journal of Information Processing Systems, vol. 5, No. 2, Jun. 2009. pp. 41-68.

"Intelligent Image Features Extraction in Knowledge Discovery Systems", published at http://www.imagefeatures.org/research/, retrieved on Aug. 1, 2014. 7 pages.

Mhatre, Amit, et al., "Efficient Search and Retrieval in Biometric Databases", SPIE Defense and Security (2001), Mar. 2005. 9 pages.

Eickeler, Stefan, et al., "Content-Based Indexing of Images and Video Using Face Detection and Recognition Methods", Acoustics, Speech, and Signal Processing, 2001. Proceedings. (ICASSP '01). 2001 IEEE International conference on, vol. 3. 4 pages.

Tsapatsoulis, Nicolas, et al., "Facial Image Indexing in Multimedia Databases", Formal Pattern Analysis & Applications (Impact Factor: 0.81). Jan. 2001. 15 pages.

Khan, Adnan Alm, et al., "Face Recognition Techniques (FRT) Based on Face Ratio under Controlled Conditions", International Symposium on Biometrics and Security Technologies, 2008. ISBAST 2008. Islamabad, Apr. 23-23, 2008. Published by IEEE pp. 1-6.

* cited by examiner

300

|  | Left Eye | Right Eye | Nose | Chin |
|---|---|---|---|---|
| Left Eye | 0 | 4 | 4.47 | 8.37 |
| Right Eye | 4 | 0 | 4.47 | 8.37 |
| Nose | 4.47 | 4.47 | 0 | 4 |
| Chin | 8.37 | 8.37 | 4 | 0 |

305, 310, 320

$$a^2 + b^2 = c^2$$
$$2^2 + 4^2 = d^2$$
$$4 + 16 = 20$$

$$d = \sqrt{20} = \sqrt{4}\sqrt{5} = 2\sqrt{5}$$

|  | $k_1$ | $k_2$ | ... | $k_m$ |
|---|---|---|---|---|
| $y_1$ | $p(y_1, \theta_{1,0})$ | $p(y_2, \theta_{2,0})$ | ... | $p(y_m, \theta_{m,0})$ |
| $y_2$ | ... | ... | ... | ... |
| ... | ... | ... | ... | ... |
| $y_n$ | ... | ... | ... | ... |

|  | $k_1$ | $k_2$ | ... | $k_m$ |
|---|---|---|---|---|
| $y_1$ | $p(y_1, \theta_{1,0}) / \sigma^2$ | $p(y_2, \theta_{2,0}) / \sigma^2$ | ... | $p(y_m, \theta_{m,0}) / \sigma^2$ |
| $y_2$ | ... | ... | ... | ... |
| ... | ... | ... | ... | ... |
| $y_n$ | ... | ... | ... | ... |

|  | K1 | K2 |
|---|---|---|
| Y1 | 0.12 | 0.88 |
| Y2 |  |  |
| ... |  |  |
| YN |  |  |

FACIAL IMAGE BUCKETING WITH EXPECTATION MAXIMIZATION AND FACIAL COORDINATES

BACKGROUND OF THE INVENTION

The present invention relates to facial image bucketing, whereby a query for facial image recognition compares the facial image against selected one(s) of existing candidate images.

Facial imaging techniques may be used to attempt verifying a person's identity based on characteristics of his or her face. In one known approach, facial image verification involves comparing a query image against each image in a set of candidate images.

BRIEF SUMMARY OF THE INVENTION

The present invention is directed to facial image bucketing. In one embodiment, this comprises: analyzing each of a plurality of facial images in a candidate image set, comprising: determining, for the each image, a location of each of a plurality of face points; computing, for the each image, a distance between the location of each of the plurality of face points; and computing, for the each image, a ratio for each unique pair of the computed distances, the computed ratios representing relationships among facial features of the each image; selecting, for the candidate image set, a subset of the facial features; clustering the facial images in the candidate image set into a plurality of buckets according to the image-specific ratio for each facial feature in the selected subset; and performing a query for a query facial image by comparing the query facial image only to images clustered into a selected subset of the plurality of buckets. Preferably, the clustering is performed using an Expectation Maximization algorithm. Performing the query preferably further comprises: determining, for the query facial image, the location of each of the plurality of face points; computing, for the query facial image, the distance between the location of each of the plurality of face points; computing, for the query facial image, the ratio for each unique pair of the computed distances; computing, for the query facial image, a probability of the computed ratios for the query facial image being in each of the plurality of buckets; and using the computed probabilities for selecting at least one of the plurality of buckets as comprising the selected subset of the plurality of buckets.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 7 and 8 illustrate matrices used for expectation maximization, according to an embodiment of the present invention, and FIG. 9 provides a hypothetical probability matrix created using results of expectation maximization and a sample set of facial features;

DETAILED DESCRIPTION OF THE INVENTION

Figure 1:
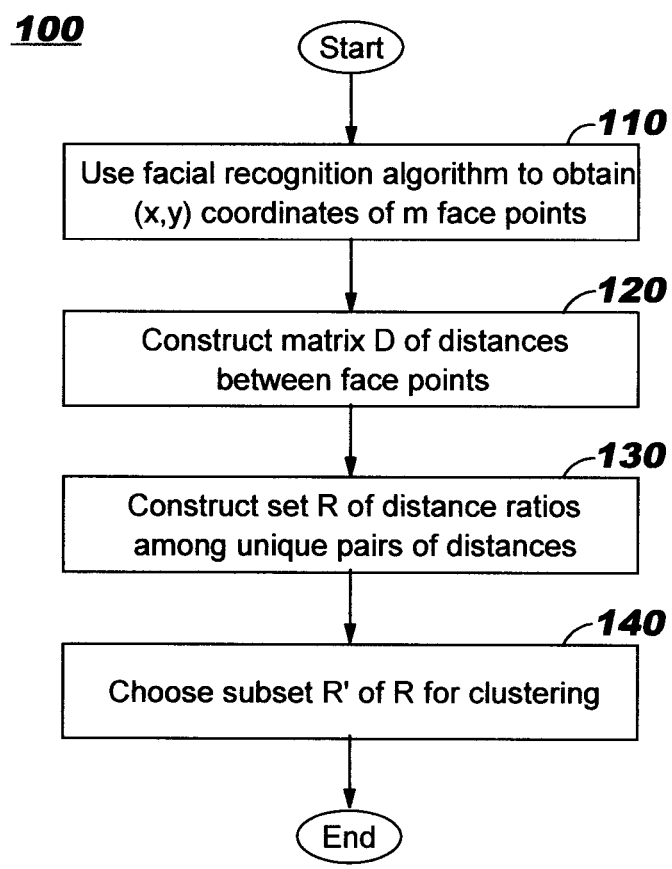
FIG. 1 presents a flowchart depicting logic which may be used when implementing a computing of face ratios.

Embodiments of the present invention are directed toward facial image bucketing with expectation maximization and facial coordinates. Use of disclosed techniques according to an embodiment of the present invention may provide improved search time when performing facial image verification, among other benefits, as will be described.

As noted earlier, a known approach to facial image verification involves comparing a query image against each image in an existing set of candidate images. In some applications, the size of the candidate image set may be quite large. An image-by-image comparison may therefore require a relatively large amount of computing power and/or search time. Reducing the size of the candidate image set—that is, the number of images to be used in the comparison—will generally increase efficiency of the facial image verification process. One approach for reducing the size of the candidate image set is indexing the set, which is also referred to herein as bucketing or clustering. However, unlike textual data sets where portions of the textual data (such as a person's name or date of birth) can be extracted and used when creating indexes over the textual data set, there is no natural sorting order for a facial image. Dividing the candidate image set into buckets therefore requires other techniques, and accordingly, embodiments of the present invention are directed to using facial features for defining the buckets, as will now be discussed in more detail.

A well-known sample set of facial images is the Face Recognition Technology database, commonly referred to as "FERET", and this sample set contains approximately 4,000 facial images. Suppose that a query image for a person is presented, and it is desired to search the FERET image corpus to find the closest match to the presented query image. Further suppose that each comparison of the query image to an image in the FERET sample set takes 0.01 seconds. The total time for the comparison processing is therefore 4,000*0.1 seconds, or a total of 40 seconds. In modern computing, this is a relatively long time to wait for a search result. And as will be obvious, if the candidate image set is drawn from a larger population, the number of candidate images will increase, resulting in an even longer search time.

An embodiment of the present invention allows reducing the search time, such that the query image will be compared to all images in some number of buckets, rather than comparing the query image to all of the candidate images in the entire candidate image set. Each bucket will contain some number (i.e., one or more) of relatively similar images, where the similar images are selected for inclusion in the bucket using techniques described herein, and the query image can then be compared to images in the bucket(s) that contain the image(s) most similar to the query image. Time spent comparing the query image to dissimilar images is thereby avoided, and the total search time can therefore be reduced.

An embodiment of the present invention identifies coordinates on the face, creates ratios based on the distance between the coordinates, and creates clusters based on these ratios. In preferred embodiments, the clusters are created using the known Expectation Maximization ("EM") algorithm. The clusters represent the buckets of images which are available for image comparison to a new facial image (e.g., for purposes of determining whether the new facial image matches any of the images in the buckets).

Disclosed techniques will now be described with reference to facial image bucketing that involves computing face ratios (see the discussion of FIGS. 1-5) for the facial images in the candidate image set (i.e., the set of images against which a newly-presented image may subsequently be compared) and then using those ratios as features for clustering with EM (see the discussion of FIGS. 6-9). The resulting buckets can then be used to more efficiently compare a query image (see the discussion of FIG. 10) to images from the set of candidate images.

Computing Face Ratios

Figure 2:
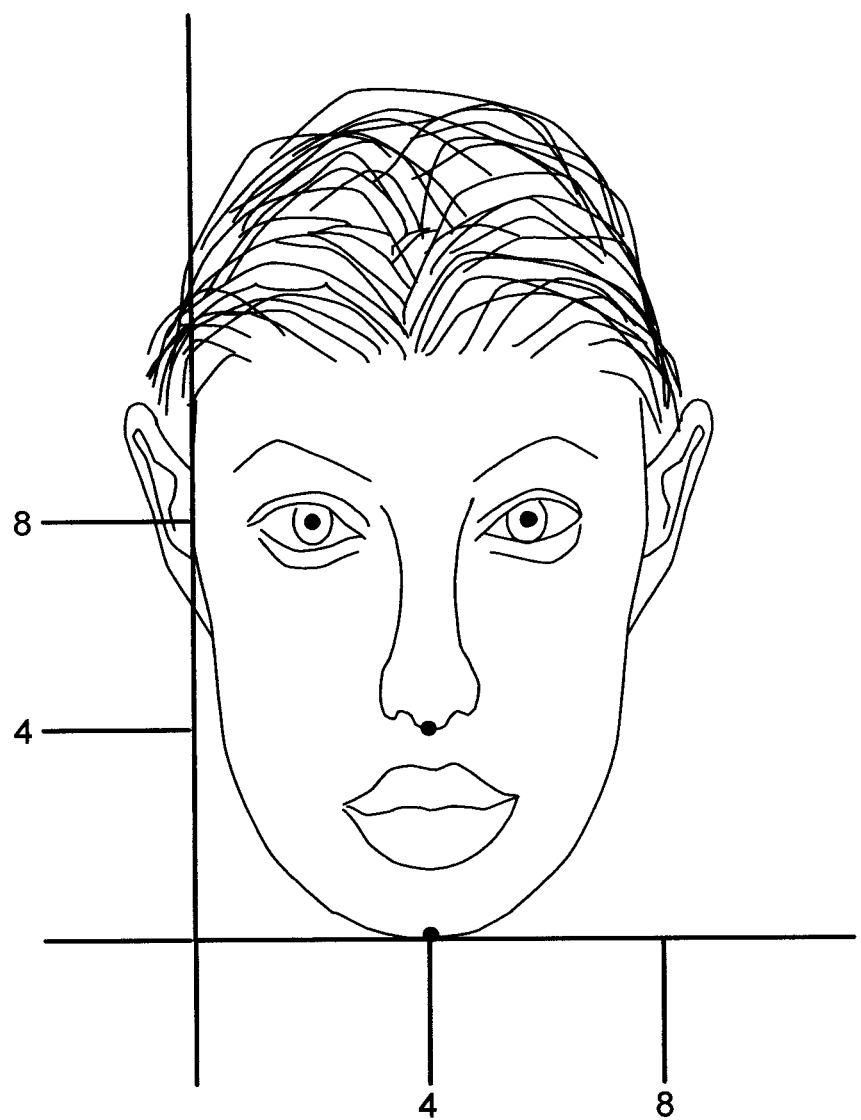
FIG. 2 provides a simple graph illustrating the location of 4 face points of a hypothetical face.

FIG. 1 presents a flowchart 100 depicting logic which may be used when implementing a computing of face ratios, according to an embodiment of the present invention, as will now be discussed. For each image in the candidate image set, use a facial recognition algorithm to obtain (x, y) coordinates of some number m of points within each facial image (Block 110). An embodiment of the present invention is illustrated herein with reference to using 4 points for each facial image, where these points comprise the center of the left eye, the center of the right eye, the tip of the nose, and the center of the chin. (Note that if the points of interest cannot be located in a particular facial image from the candidate image set, an embodiment of the present invention preferably omits that image from further consideration.) Suppose that the sample data for a hypothetical face locates these 4 points at (2, 8), (6, 8), (4,4), and (4,0) of a 2-dimensional coordinate system. FIG. 2 provides a simple graph illustrating the location of these points of the hypothetical face.

In the general case, the m points of a particular facial image comprise the set $(x_1, y_1), (x_2, y_2), \ldots (x_m, y_m)$. Let the notation $p_i$ denote the face point having coordinates $(x_i, y_i)$, where $1 \leq i \leq m$.

Construct a matrix D for the particular facial image (Block 120), where each matrix entry $d_{ij}$ denotes the Euclidean distance between the face points $p_i$ and $p_j$, where $1 \leq i \leq m$ and $1 \leq j \leq m$, by computing the Euclidean distance between each pair of points $p_i$ and $p_j$ of the facial image.

In the general case, the matrix D holds the distance between any 2 face points that were found at Block 110, for the particular facial image, using the facial recognition algorithm. For example, if face point $p_1$ is the left eye center and $p_2$ is the right eye center, then matrix entry $d_{12}$ is the distance between the left eye center and the right eye center.

Figures 3, 4, 5:
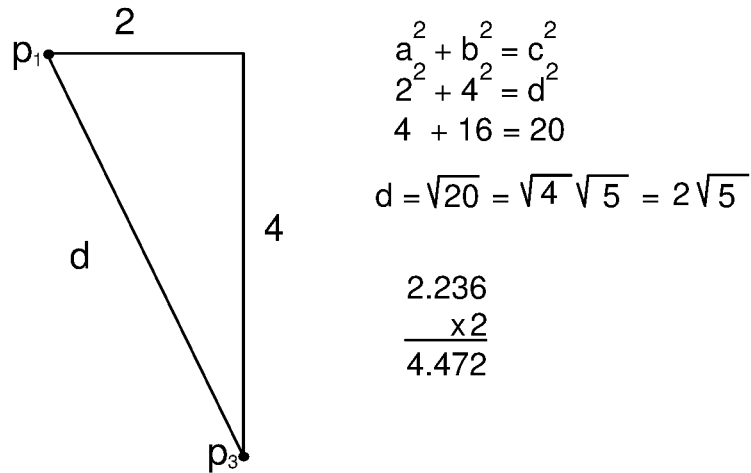
FIG. 3 presents a sample matrix D for these 4 points of the sample facial image.
FIG. 4 illustrates the computations that determine the Euclidean distance between points of the hypothetical face.
FIG. 5 shows ratios between unique pairs of distances for face points of the hypothetical face.

See FIG. 3, which presents a sample matrix D for the 4 points of the sample facial image illustrated by FIG. 2. Matrix entry $d_{12}$ is shown at reference number 305 of this matrix 300. Similarly, if face point $p_3$ is the tip of the nose, then matrix entry $d_{13}$ is the distance between the left eye center and the tip of the nose, and conversely, matrix entry $d_{31}$ is the distance between the tip of the nose and the left eye center. See reference numbers 310, 320, respectively.

As noted above, Euclidean geometry is used in preferred embodiments to calculate the entries for the matrix D. By review of the sample data, it can be seen that the Euclidean distance between the left eye center and the right eye center for the hypothetical face is calculated as the distance between points (2, 8) and (6, 8), resulting in a value of 4 units for matrix entry $d_{12}$, as shown at reference number 305. Using the sample data with reference to matrix entry $d_{13}$, the distance between the left eye center and the tip of the nose is calculated as the Euclidean distance between (2, 8) and (4, 4). See FIG. 4, which illustrates the computations that determine this distance as the square root of 20, or equivalently, 2*(square root of 5), which is approximately 4.47, as shown at reference number 310.

Construct a set R (Block 130) to hold what are referred to herein as "distance ratios". Each distance ratio is computed from a unique pair of distances $d_i$, $d_j$ found in matrix D by computing the fraction (i.e., ratio) of those points as $d_i/d_j$. Notably, these distance ratios represent the relationships among the facial features present in the particular facial image.

Referring again to the sample data shown in FIG. 3 for matrix D, the unique values are 0, 4, 4.47, and 8.37. Ignoring the 0 values, and using a convention that ensures distance ratios are greater than 1, the unique pairs of distances are reflected in the ratios shown at 500 in FIG. 5. These ratios can then be reduced to the decimal numbers shown at 510, which together comprise the set R.

Now, choose a subset of R (Block 140) as the set of features that are used in the subsequent clustering algorithm. This subset is the set of features that are deemed to uniquely represent one individual face. For the sample set R shown at 510 of FIG. 5, suppose the subset R' chosen at Block 140 comprises the values {1.1175, 1.87}. For the sample data, the first of these ratios represents the relationship between (1) the distance from either eye to the nose and (2) the distance between the eyes, and the second of these ratios represents the relationship between (1) the distance from either eye to the chin and (2) the distance from either eye to the nose.

In summary, the processing represented by FIG. 1 creates a set of features (or "face ratios") based on ratios of distances between points on the face.

Clustering with Expectation Maximization

Figure 6:
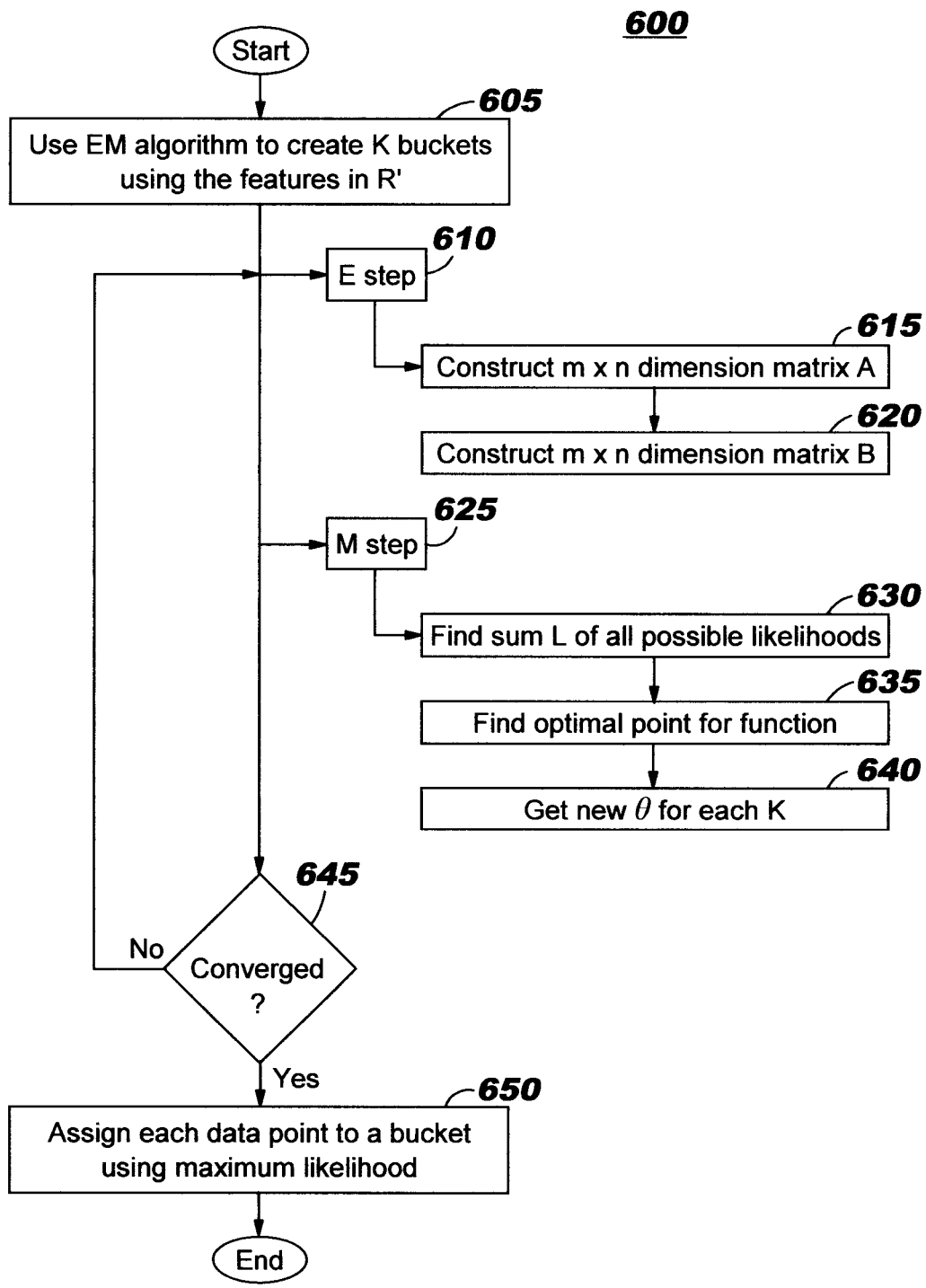
FIG. 6 presents a flowchart depicting logic which may be used when implementing a clustering with expectation maximization.

FIG. 6 presents a flowchart 600 depicting logic which may be used when implementing a clustering with expectation maximization, according to an embodiment of the present invention, as will now be discussed.

EM is a known iterative algorithm that alternates between two steps, which are commonly referred to as the "E" step (for "expectation") and the "M" step (for "maximization"), and is used in a preferred embodiment for clustering the images of the candidate image set. As is readily understood by those of skill in the art, the M step uses values from the E step for computing likelihood, and the E and M steps are performed iteratively until reaching convergence (and it has been shown conclusively that convergence will be reached). Accordingly, use the EM algorithm (Block 605) to create k buckets using the choice of features in R'. The algorithm finds parameters for k Gaussian distributions, where these k distributions will represent the k buckets. (That is, a bucket is defined in terms of a distribution of each individual feature corresponding to the set of feature space defined by R'.) The value of k may be chosen, for example, by a human user in view of how refined the clustering of images to buckets should be: a lower value of k results in fewer buckets and therefore less refinement, while a higher value of k results in more buckets that each contain images which are more similar to one another than when using fewer buckets.

The E step (Block 610) comprises creating an m×n dimension matrix A (Block 615) and an m×n dimension matrix B (Block 620). In the general case, suppose it is desired to have k Gaussian distributions, and for each such distribution, initial parameters are $\theta_0$ ($\mu_0$, $\sigma^2$). (As will be readily understood by those of ordinary skill in the relevant art, $\theta_0$ represents an initial vector of parameters, $\mu_0$ represents an initial mean, and $\sigma^2$ represents an initial standard deviation.) There are n data points, where each point is a vector of features from R'. The value of m is equal to k, in a preferred embodiment. Thus, both matrix A and matrix B may be seen as having a column for each of the k buckets, where each row contains n vectors of data points.

The matrix A created at Block 615 is comprised of elements $a_{ij}=P(y_1, \theta_{km,0})$. Matrix A thus represents probability, and a representation of matrix A is illustrated visually at 700 of FIG. 7. The matrix B created at Block 620 is comprised of elements $b_{ij}=P(y_1, \theta_{kj,0})/\sigma^2$. Matrix B thus further represents the standard deviation, and a representation of matrix B is illustrated visually at 800 of FIG. 8.

The M step (Block 625) comprises computing a sum L of all possible likelihood values l (Block 630), finding the optimal point for this function (Block 635), and then obtaining a new value of $\theta$ for each of the k buckets (Block 640). That is, each bucket will have its own mean and standard deviation, in view of the images in that bucket and their similarity to one another. In the general case, suppose that we have the following choice: $p(k_1, y_1), p(k_2, y_2), \ldots p(k_m, y_n)$, with each k having its own expected value of $\theta$. The likelihood of this choice is given by:

$$l_1 = p(k_1,y_1)*p(k_2,y_2)* \ldots *p(k_m,y_n)*\log[p(k_1,y_1)*p(k_2,y_2)* \ldots *p(k_m,y_n)]$$

Thus, the sum L computed at Block 630 is the sum of all the possible l values according to this equation.

Following completion of the E and M steps, Block 645 tests whether convergence has occurred. If not, control returns to Block 610 to begin another iteration of the E and M steps.

When convergence has occurred, on the other hand, there are now k Gaussian distributions, which represent the k buckets. Block 650 then assigns each data point $y_i$ to a bucket $k_j$ by selecting the bucket that maximizes $p(y_i|k_j)$. Processing of FIG. 6 is then complete.

The processing of FIG. 6 will now be illustrated with reference to the previously-discussed sample data represented by FIG. 2. Suppose a hypothetical probability matrix is created for 2 buckets and 1 facial image. Thus, the matrices A and B each have 2 columns, and each vector has 1 member. Suppose that executing the EM algorithm produces the following values:

Bucket K1, feature 1: mean=0.5, standard deviation=0.4
Bucket K1, feature 2: mean=1.2, standard deviation=0.3
Bucket K2, feature 1: mean=1.2, standard deviation=0.2
Bucket K2, feature 2: mean=1.9, standard deviation=0.1

Using these results of the EM algorithm and the sample feature set R'={1.1175, 1.87}, a hypothetical probability matrix 900 is created as shown in FIG. 9.

Querying for a Bucket

Figure 10:
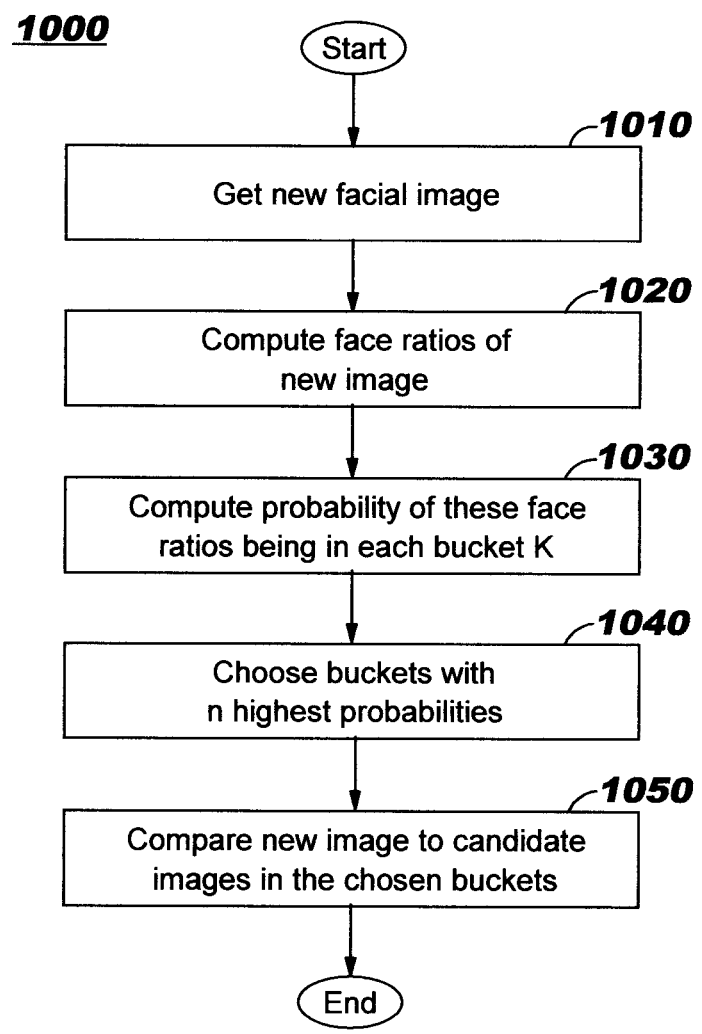
FIG. 10 provides a flowchart depicting logic which may be used when comparing a new previously-unseen facial image to bucketed images in a query operation.

After the buckets have been computed and the facial images are assigned to their respective buckets as described above, a new previously-unseen facial image can be compared against bucketed images in a query operation. FIG. 10 provides a flowchart 1000 depicting logic which may be used when implementing this process, as will now be described.

The new image is obtained (Block 1010). To avoid comparing the new image to all images in the entire candidate image set, an embodiment of the present invention finds the closest n buckets for the new image by computing face ratios for the new image, using the same facial points that were used for clustering the images of the candidate image set. Accordingly, the face ratios are computed for the new image (Block 1020).

The probability that the face ratios of the new image are in each of the k buckets is computed (Block 1030). That is, for each bucket k, compute p (face ratios$_{new\ face}$|k). Next, choose some number n of the k buckets (Block 1040), where these chosen bucket(s) are those with the highest probabilities computed at Block 1030. Finally, compare the new face to the candidate image(s) in the chosen bucket(s) (Block 1050). A known facial image comparison algorithm may be used in this comparison at Block 1050.

Suppose that the new face has feature set R'={1.2, 1.8}, as determined by Block 1020. Further suppose that the probability of this new face belonging to buckets K1 and K2 is computed by Block 1030 as being 0.1 and 0.9, respectively. Thus, it is likely that the new image will most closely match a candidate image in bucket K2, rather than any image in bucket K1. In this simple example, the search space is reduced on average by 50 percent by using 2 buckets to divide the search space in half. The facial image comparison performed at Block 1050 thus returns the most likely match of the real person, in view of the query image provided at Block 1010, to the candidate images.

Note that when a plurality of buckets exist, the number chosen as n (see Block 1040) may be selected, in one approach, by a human user. Information presented on a graphical user interface of a computing device may assist the user in making this decision. For example, a chart may be prepared showing the number of images that have been assigned to each bucket, and the user may then evaluate whether a total number of images in 3 of the highest-probability buckets (as determined according to the computation in Block 1030) appears to provide a sufficient search, or whether the 4 highest-probability buckets might provide a better result, and so forth. Suppose, by way of illustration, that a candidate image set contains 4,000 images and that it is determined to assign these images to k=20 different buckets by operation of the EM algorithm. A chart may then be constructed, showing how many images are in each of these 20 buckets. When a new facial image is presented for comparison in a query according to the processing of FIG. 10, the chart may be augmented with the probability information computed at Block 1030 to show the probability associated with each of the 20 buckets, thereby guiding a user in selecting an appropriate number n of the highest-probability ones of the 20 buckets at Block 1040, where these n selected buckets are then used in the comparison of the new image at Block 1050. (Note that the highest-probability buckets are not necessarily those with the highest number of images, and instead are the buckets containing images for which the face ratios selected for inclusion in set R' are most similar to the presented image.)

As has been demonstrated, an embodiment of the present invention provides bucketing of images to reduce the search space and to thereby allow for quicker matching when performing facial image verification. Efficiencies are gained in the query process by only thoroughly comparing a subset of facial images, where that subset comprises the image(s) in the bucket(s) having the highest probability that they are the most likely candidate images for matching a newly-presented facial image.

Figure 11:
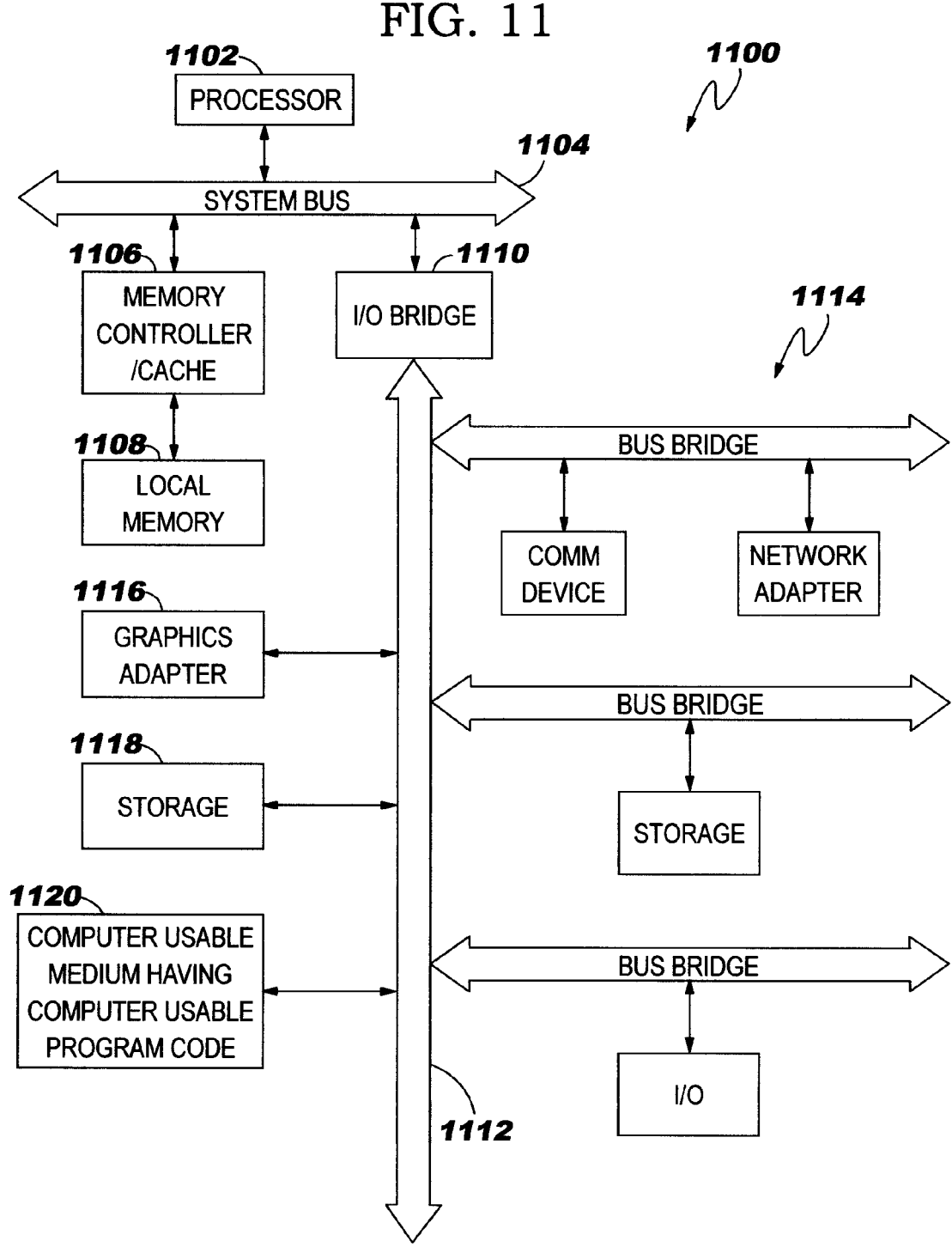
FIG. 11 depicts a block diagram of a data processing system in accordance with an embodiment of the present invention.

Referring now to FIG. 11, a block diagram of a data processing system is depicted in accordance with the present invention. Data processing system 1100 may comprise a processor 1102 connected to system bus 1104. Also connected to system bus 1104 is memory controller/cache 1106, which provides an interface to local memory 1108. An I/O bridge 1110 is connected to the system bus 1104 and provides an interface to an I/O bus 1112. The I/O bus may be utilized to support one or more buses 1114 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1116, storage 1118, and a computer usable storage medium 1120 having computer usable program code embodied thereon. The computer usable program code may be executed to execute any aspect of the present invention, as have been described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for facial image bucketing, comprising:
   analyzing each of a plurality of facial images in a candidate image set, comprising:
   determining, for the each image, a location of each of a plurality of face points;
   computing, for the each image, a distance between the location of each of the plurality of face points; and
   computing, for the each image, a ratio for each unique pair of the computed distances, the computed ratios representing relationships among facial features of the each image;
   selecting, for the candidate image set, a subset of the facial features;
   clustering the facial images in the candidate image set into a plurality of buckets according to the image-specific ratio for each facial feature in the selected subset, comprising iteratively computing a mean and a standard deviation, according to the image-specific ratio for each facial feature in the selected subset, for each of at least one image to be included in each of the plurality of buckets until achieving convergence; and
   storing the plurality of buckets on a storage medium for subsequent use in performing a query for a query facial image to determine which of the plurality of facial images is most similar to the query facial image, wherein the query facial image is compared only to images clustered into a selected subset of the plurality of buckets.

2. The method according to claim 1, wherein the clustering is performed using an Expectation Maximization algorithm.

3. The method according to claim 1, wherein a count of the plurality of buckets to be used for the clustering is provided by a user.

4. The method according to claim 1, further comprising using the stored buckets for performing the query by performing:
   determining, for the query facial image, the location of each of the plurality of face points;
   computing, for the query facial image, the distance between the location of each of the plurality of face points;
   computing, for the query facial image, the ratio for each unique pair of the computed distances;
   computing, for the query facial image, a probability of the computed ratios for the query facial image being in each of the plurality of buckets; and
   using the computed probabilities for selecting at least one of the plurality of buckets as comprising the selected subset of the plurality of buckets.

5. The method according to claim 4, wherein:
   the selected subset of the plurality of buckets comprises one or more of the plurality of buckets for which the computed probability is highest.

6. The method according to claim 5, wherein:
   a user provides a count of the plurality of buckets to include in the selected subset of the plurality of buckets.

7. The method according to claim 4, wherein:
   performing the query determines which of the plurality of facial images is most similar to the query facial image.

8. A system for facial image bucketing, comprising:
   a plurality of facial images in a candidate image set stored in persistent storage of a computing system;
   a computer comprising a processor; and
   instructions which are executable, using the processor, to perform functions comprising:
   analyzing each of a plurality of facial images in a candidate image set, comprising:
   determining, for the each image, a location of each of a plurality of face points;
   computing, for the each image, a distance between the location of each of the plurality of face points; and
   computing, for the each image, a ratio for each unique pair of the computed distances, the computed ratios representing relationships among facial features of the each image;
   selecting, for the candidate image set, a subset of the facial features;
   clustering the facial images in the candidate image set into a plurality of buckets according to the image-specific ratio for each facial feature in the selected subset, comprising iteratively computing a mean and a standard deviation, according to the image-specific ratio for each facial feature in the selected subset, for each of at least one image to be included in each of the plurality of buckets until achieving convergence; and
   storing the plurality of buckets on a storage medium for subsequent use in performing a query for a query facial image to determine which of the plurality of facial images is most similar to the query facial image, wherein the query facial image is compared only to images clustered into a selected subset of the plurality of buckets.

9. The system according to claim 8, wherein the clustering is performed using an Expectation Maximization algorithm.

10. The system according to claim 8, wherein the functions further comprise using the stored buckets for performing the query by performing:
- determining, for the query facial image, the location of each of the plurality of face points;
- computing, for the query facial image, the distance between the location of each of the plurality of face points;
- computing, for the query facial image, the ratio for each unique pair of the computed distances;
- computing, for the query facial image, a probability of the computed ratios for the query facial image being in each of the plurality of buckets; and
- using the computed probabilities for selecting at least one of the plurality of buckets as comprising the selected subset of the plurality of buckets.

11. The system according to claim 10, wherein:
the selected subset of the plurality of buckets comprises one or more of the plurality of buckets for which the computed probability is highest.

12. The system according to claim 10, wherein:
performing the query determines which of the plurality of facial images is most similar to the query facial image.

13. A computer program product for facial image bucketing, the computer program product comprising:
a computer-readable storage medium having computer readable program code embodied therein, the computer-readable program code configured for:
- analyzing each of a plurality of facial images in a candidate image set, comprising:
  - determining, for the each image, a location of each of a plurality of face points;
  - computing, for the each image, a distance between the location of each of the plurality of face points; and
  - computing, for the each image, a ratio for each unique pair of the computed distances, the computed ratios representing relationships among facial features of the each image;
- selecting, for the candidate image set, a subset of the facial features;
- clustering the facial images in the candidate image set into a plurality of buckets according to the image-specific ratio for each facial feature in the selected subset, comprising iteratively computing a mean and a standard deviation, according to the image-specific ratio for each facial feature in the selected subset, for each of at least one image to be included in each of the plurality of buckets until achieving convergence; and
- storing the plurality of buckets on a storage medium for subsequent use in performing a query for a query facial image to determine which of the plurality of facial images is most similar to the query facial image, wherein the query facial image is compared only to images clustered into a selected subset of the plurality of buckets.

14. The computer program product according to claim 13, wherein the clustering is performed using an Expectation Maximization algorithm.

15. The computer program product according to claim 13, wherein the computer-readable program code is further configured for using the stored buckets for performing the query by performing:
- determining, for the query facial image, the location of each of the plurality of face points;
- computing, for the query facial image, the distance between the location of each of the plurality of face points;
- computing, for the query facial image, the ratio for each unique pair of the computed distances;
- computing, for the query facial image, a probability of the computed ratios for the query facial image being in each of the plurality of buckets; and
- using the computed probabilities for selecting at least one of the plurality of buckets as comprising the selected subset of the plurality of buckets.

16. The computer program product according to claim 15, wherein:
the selected subset of the plurality of buckets comprises one or more of the plurality of buckets for which the computed probability is highest.

17. The computer program product according to claim 15, wherein:
performing the query determines which of the plurality of facial images is most similar to the query facial image.

* * * * *